(12) United States Patent
Minto et al.

(10) Patent No.: US 10,859,102 B2
(45) Date of Patent: Dec. 8, 2020

(54) BICYCLE COMPONENT COMPRISING A REMOVABLE CLAMPING DEVICE FOR FIXING TO A TUBULAR ELEMENT OF THE BICYCLE

(71) Applicant: Campagnolo S.r.l., Vicenza (IT)

(72) Inventors: Marco Minto, Mirano (IT); Christian Marangon, Thiene (IT)

(73) Assignee: Campagnolo S.r.l., Vicenza (IT)

( * ) Notice: Subject to any disclaimer, the term of this patent is extended or adjusted under 35 U.S.C. 154(b) by 50 days.

(21) Appl. No.: 16/055,726

(22) Filed: Aug. 6, 2018

(65) Prior Publication Data
US 2019/0040885 A1 Feb. 7, 2019

(30) Foreign Application Priority Data
Aug. 7, 2017 (IT) .................... 102017000090935

(51) Int. Cl.
| | |
|---|---|
| *B62J 11/00* | (2020.01) |
| *F16B 2/18* | (2006.01) |
| *B62K 23/02* | (2006.01) |
| *B62M 9/135* | (2010.01) |
| *B62K 23/06* | (2006.01) |
| *F16B 7/14* | (2006.01) |

(52) U.S. Cl.
CPC ............. *F16B 2/185* (2013.01); *B62J 11/00* (2013.01); *B62K 23/02* (2013.01); *B62M 9/135* (2013.01); *B62K 23/06* (2013.01); *F16B 7/1454* (2013.01)

(58) Field of Classification Search
USPC ..... 248/230.8, 230.6, 230.7, 231.71, 231.81; 280/288.4
See application file for complete search history.

(56) References Cited

U.S. PATENT DOCUMENTS

| | | | |
|---|---|---|---|
| 4,453,290 A | 6/1984 | Riedel | |
| 5,305,978 A | 4/1994 | Current | |
| 5,323,664 A | 6/1994 | Fairfield et al. | |
| 5,405,113 A * | 4/1995 | Jaw | B62J 11/00 224/425 |
| 6,277,069 B1 * | 8/2001 | Gray | A61B 17/6466 600/234 |

(Continued)

FOREIGN PATENT DOCUMENTS

| | | |
|---|---|---|
| CN | 201 646 958 U | 11/2010 |
| CN | 202 806 957 U | 3/2013 |

(Continued)

OTHER PUBLICATIONS

Italian Search Report and Written Opinion in Italian Application No. 102017000090935, dated May 15, 2018, with English translation.

*Primary Examiner* — Alfred J Wujciak
(74) *Attorney, Agent, or Firm* — Volpe Koenig

(57) ABSTRACT

A clamp configured for connecting a bicycle component to a tubular element of the bicycle. The body of the bicycle component has a through opening extending between surfaces of the body and a seat on one surface that connects with the through opening. The clamp has an annular band that is connected to a slider in the through opening. An actuation lever connected to the slider moves the slider between a release position and a clamping position. When the slider is in the claiming position, the actuation lever is position in the seat on the body.

17 Claims, 8 Drawing Sheets

(56) References Cited

U.S. PATENT DOCUMENTS

| | | | | |
|---|---|---|---|---|
| 6,494,327 B2* | 12/2002 | Huang | ............... | A47F 5/0892 |
| | | | | 211/107 |
| 7,152,834 B2* | 12/2006 | Hsu | ................ | B62J 11/00 |
| | | | | 248/230.1 |
| 7,179,200 B1* | 2/2007 | Wu | ................ | A61G 5/10 |
| | | | | 135/67 |
| 7,407,140 B2* | 8/2008 | Sen | ................ | E03C 1/066 |
| | | | | 239/283 |
| 7,556,229 B2* | 7/2009 | Elliott | .............. | F16B 2/185 |
| | | | | 224/536 |
| 8,979,050 B2* | 3/2015 | Yu | ................ | A47C 3/28 |
| | | | | 248/181.1 |
| 2008/0072697 A1 | 3/2008 | Fujii | | |
| 2010/0200715 A1 | 8/2010 | Kuipers | | |
| 2015/0000452 A1 | 1/2015 | Hirotomi et al. | | |
| 2015/0001018 A1 | 1/2015 | Kariyama et al. | | |
| 2015/0096402 A1 | 4/2015 | Hirotomi et al. | | |
| 2016/0324701 A1* | 11/2016 | Cambridge | ............. | F16B 2/18 |
| 2017/0108760 A1* | 4/2017 | Achenbach | ......... | G03B 17/561 |

FOREIGN PATENT DOCUMENTS

| | | |
|---|---|---|
| CN | 206 031 605 U | 3/2017 |
| GB | 2 082 891 A | 3/1982 |
| JP | S55 23914 U | 2/1980 |
| JP | 2009 121033 A | 6/2009 |

* cited by examiner

BICYCLE COMPONENT COMPRISING A REMOVABLE CLAMPING DEVICE FOR FIXING TO A TUBULAR ELEMENT OF THE BICYCLE

CROSS REFERENCE TO RELATED APPLICATION(S)

This application claims the benefit of Italian Patent Application No. 102017000090935, filed on Aug. 7, 2017, which is incorporated herein by reference as if fully set forth.

FIELD OF INVENTION

The present invention relates to fixing a bicycle component to a tubular element of the bicycle. More particularly, the invention relates to a bicycle component having a main body with a surface configured to be associated with the tubular element and a surface configured to enable the use of a removable clamping device.

BACKGROUND

The invention has a preferred application in the field of racing bicycles.

In the rest of the description and claims reference will be made to the non-limiting examples of a bicycle component such as a control assembly of bicycle handlebars, to be associated with a tubular element such as a handlebar tube. However, the invention can also refer to a derailleur, to be associated with a tubular element such as a tube of the frame, in particular with the seat tube of the frame (i.e. that which supports the saddle tube of the bicycle at the top).

In order to associate the aforementioned bicycle component with the tubular element of the bicycle, a removable clamping device is used, which typically comprises an annular strap element, fixed to the main body of the bicycle component and wrapping around the tubular element of the bicycle. The strap, typically metallic, is clamped through the screwing of a nut on a screw, so as to securely tighten together two substantially facing end portions of the strap.

The mounting operations of the aforementioned bicycle component include the positioning of the screw and the screwing of the nut, and take a certain amount of time.

US 2015/0096402 and US 2015/0000452 show removable clamping devices that comprise an annular element able to be clamped through a screw.

The technical problem at the basis of the present invention is that of providing a bicycle component comprising a removable clamping device for fixing to a tubular element of the bicycle, which ensures quick mounting of the bicycle component at the tubular element of the bicycle and equally quick dismounting thereof, at the same time ensuring secure and reliable clamping.

SUMMARY

The present invention concerns a removable clamping device for attaching a bicycle component. More particularly, a component according to the invention comprises a removable clamping device for fixing to a tubular element of the bicycle and a main body having a rear surface configured to be associated with the tubular element, the removable clamping device comprising an annular element configured to wrap around the tubular element. The main body comprises a through opening extending between the rear surface and a front surface. The removable clamping device includes a slider connected at a first end portion the annular element and a lever for actuating the slider for movement in the through opening between a release position and a clamping position.

Advantageously, the aforementioned removable clamping device makes it possible to obtain quick mounting and dismounting of the component, through a simple movement of the actuation lever of the slider. The clamping is provided by the forced contact between the rear surface of the main body and the tubular element, which is pulled towards the rear surface of the main body through the annular element. Such clamping has proven secure and reliable.

Preferably, in the locked position the lever is at least partially encased in a seat formed on the front surface of the main body.

Advantageously, the external space occupied by the bicycle component locked on the tubular element of the bicycle is reduced and the risk of undesired movement of the lever from the locked position is thus avoided.

BRIEF DESCRIPTION OF THE DRAWING(S)

The features and advantages of the invention will become clearer from the description of preferred embodiments made with reference to the attached drawings, in which.

DETAILED DESCRIPTION OF THE PREFERRED EMBODIMENTS

Figure 1:
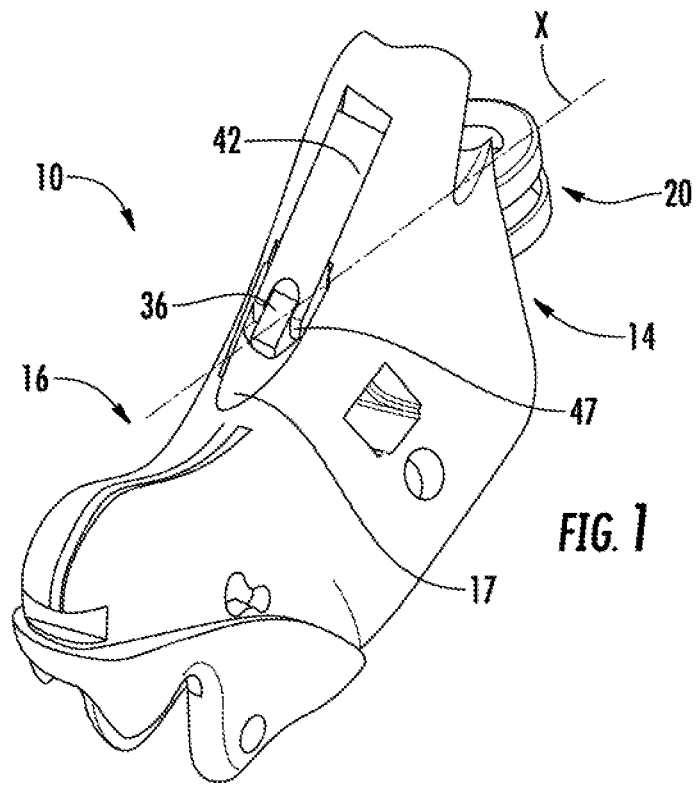
FIG. 1 is a schematic perspective view of a first preferred embodiment of a bicycle component, comprising a removable clamping device for fixing to a tubular element of the bicycle, in accordance with the present invention.

In a first preferred embodiment of the bicycle component of the invention, the lever is roto-translatable with respect to the slider, with rotation that occurs around a pin having axis perpendicular to a longitudinal axis of the slider.

Preferably, said pin is fixedly connected to the actuation lever and is engaged in a seat of the slider.

In a second preferred embodiment of the bicycle component of the invention, the lever is rotatable with respect to the main body, with rotation that takes place around a longitudinal axis of the slider.

Preferably, the slider comprises a cylindrical second end portion and the lever comprises a collar portion rotatably mounted around the second end portion of the slider.

More preferably, the slider has a groove formed on the second end portion thereof, and the lever has a projecting tooth or follower that projects radially inwards from the collar portion and slides in the groove during the rotation of the actuation lever.

The annular element can be closed or openable.

Advantageously, the closed annular element ensures greater simplicity and solidity, whereas the openable annular element can be applied more easily to the tubular element of the bicycle.

Preferably, the annular element is made with a substantially flat strip, wound and closed on itself in a loop.

More preferably, the strip comprises two through openings arranged at its two opposite end portions, overlapping one another.

Advantageously, in the two juxtaposed through openings it is possible to slot a fixing screw of the annular element to the slider, or in the two overlapping through openings it is possible to slot the slider itself, as outlined below.

Preferably, one through opening is a hole and the other through opening is a slot.

Advantageously, the slot allows the annular element to be adapted to bicycle tubular elements of different sizes.

In an embodiment, the annular element is connected to an end portion of the slider by means of a screw.

In an alternative embodiment, the slider has the first end portion enlarged and is slotted into the two through openings, overlapping one another.

Preferably, in the locked position the lever is entirely encased in the seat formed on the front surface of the main body.

Preferably, the component is a control assembly of bicycle handlebars or the component is a derailleur.

With reference to FIGS. 1-8, reference numeral 10 indicates a bicycle component in accordance with a first preferred embodiment of the present invention.

The bicycle component 10 is intended to be fixed to a tubular element of the bicycle, for example handlebars M.

Figure 1A:
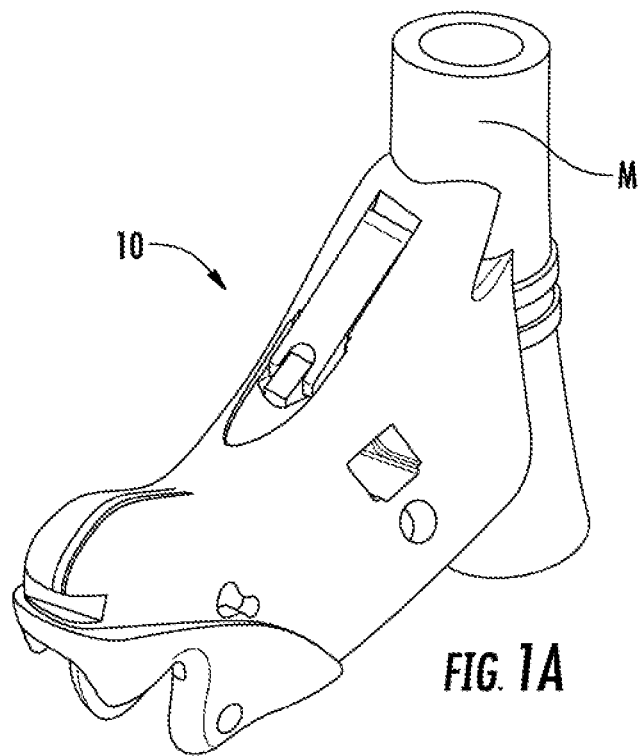
FIG. 1a shows the component of FIG. 1 applied to bicycle handlebars.
Figure 2:
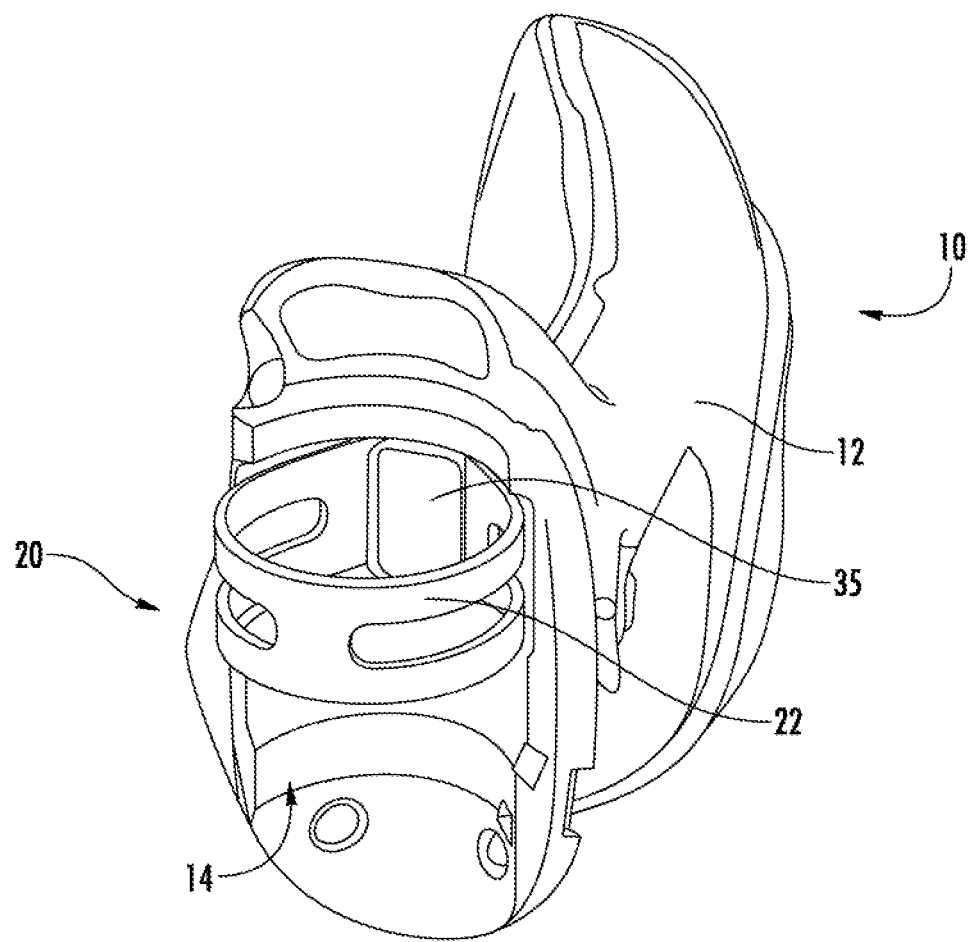
FIG. 2 is a schematic perspective view of the bicycle component of FIG. 1, seen from an opposite side with respect to FIG. 1.

In the non-limiting example illustrated in the figures, the bicycle component 10 is a control assembly of bicycle handlebars (in particular an integrated brake and gearshift control) and the tubular element is a tube of the bicycle handlebars. In the figures, only a main body 12 of the component 10 is illustrated, since the other parts thereof at per se conventional and not relevant for the purposes of the present invention. FIG. 1a shows the component 10 applied to a portion of the handlebars M.

Alternatively, it is possible for the bicycle component to be, for example, a derailleur; in this case, the tubular element is the seat tube of the frame (i.e. that which supports the saddle tube of the bicycle at the top).

As illustrated in FIGS. 1-4, the bicycle component 10 comprises a removable clamping device 20 for fixing to the tubular element of the bicycle.

The main body 12 of the bicycle component 10 has a rear surface 14 configured to be associated with the tubular element (for example with the handlebars M), resting against it, and an opposite front surface 16.

The removable clamping device 20 comprises an annular element 22, configured to wrap around the tubular element, a slider 32 connected to the annular element 22 and an actuation lever 42 of the slider 32.

The slider 32 extends along its longitudinal axis X and is slidable along such an axis X in a through opening 18 of the main body 12, extending between the rear surface 14 and the front surface 16.

As illustrated in FIGS. 5-8, the slider 32 is connected to the annular element 22 at a first end portion 34 thereof, so that the annular element 22 slides together with the slider 32. An opposite second end portion 36 of the slider 32 is connected to the lever 42.

The slider 32 is slidable in the through opening 18 between a first position or release position (FIG. 4) and a second position or clamping position (FIG. 3); in the clamping position, the annular element 22 is pulled towards the rear surface 14 of the main body 12, so as to clamp the tubular element surrounded by the annular element 22 against the rear surface 14.

Figure 3:
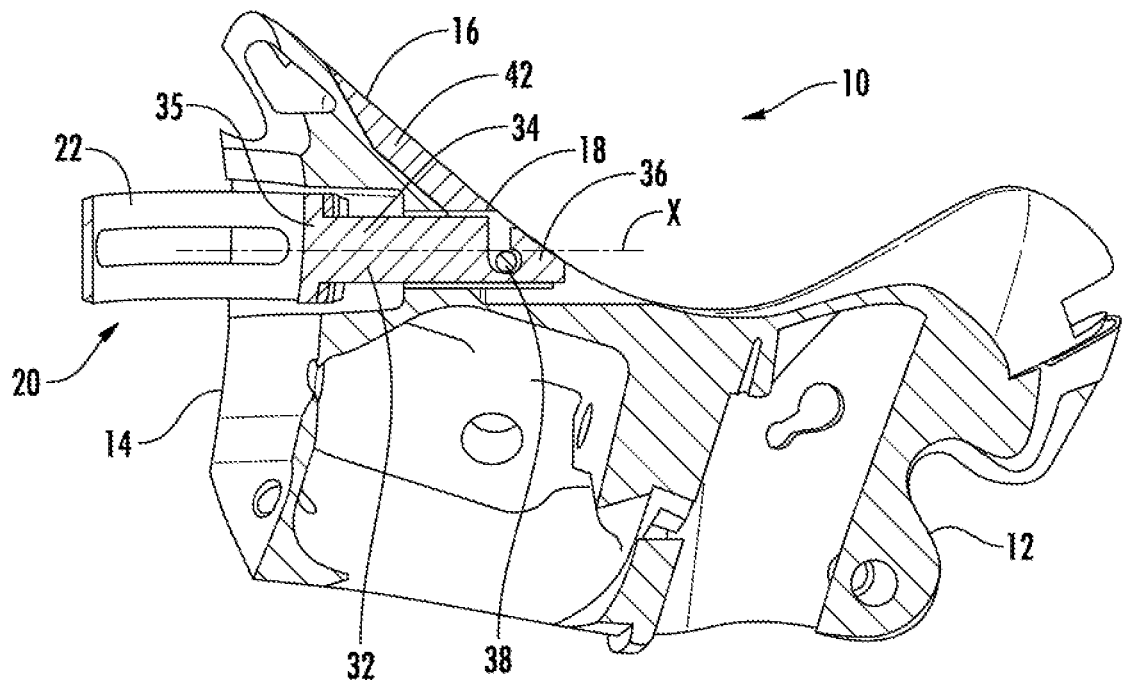
FIG. 3 is a schematic longitudinal section of the bicycle component of FIG. 1, with the removable clamping device in a clamping configuration.

The lever 42 of the slider 32 engages on the slider 32 and on the main body 12 and is mobile with respect to the main body 12 between a first position or unlocked position (FIG. 4) and a second position or locked position (FIG. 3).

As illustrated in FIG. 3, when the lever 42 is in the locked position, the slider 32 is in the clamping position.

Figure 4:
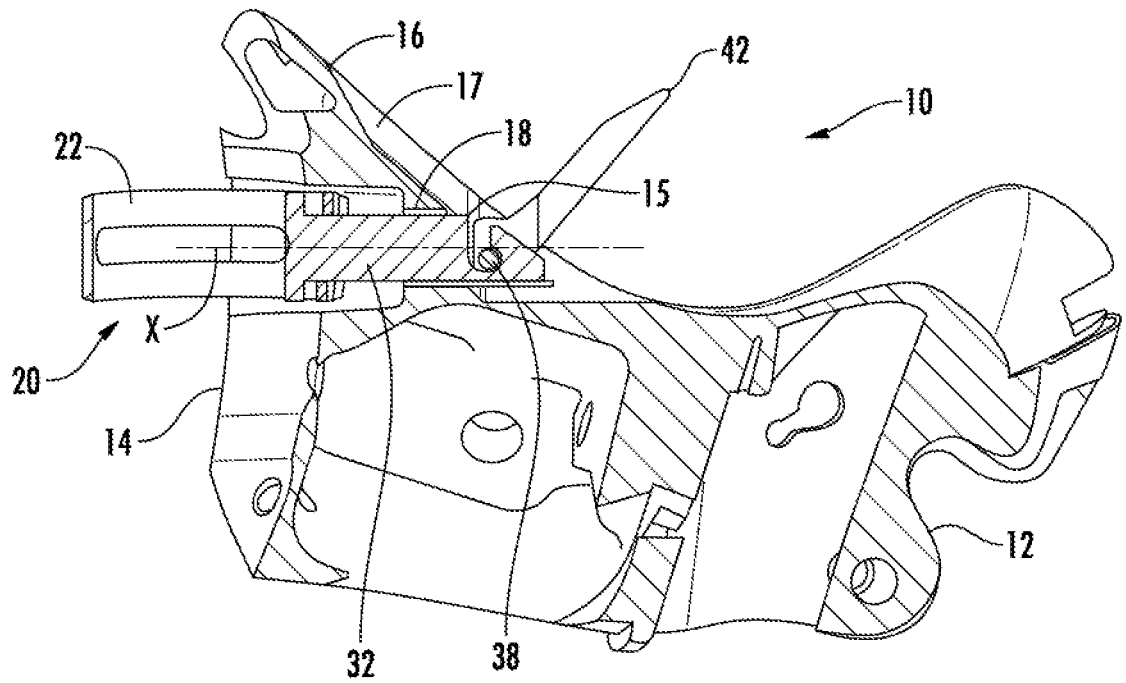
FIG. 4 is a schematic longitudinal section of the bicycle component of FIG. 1, with the removable clamping device in a release configuration.
Figure 5:
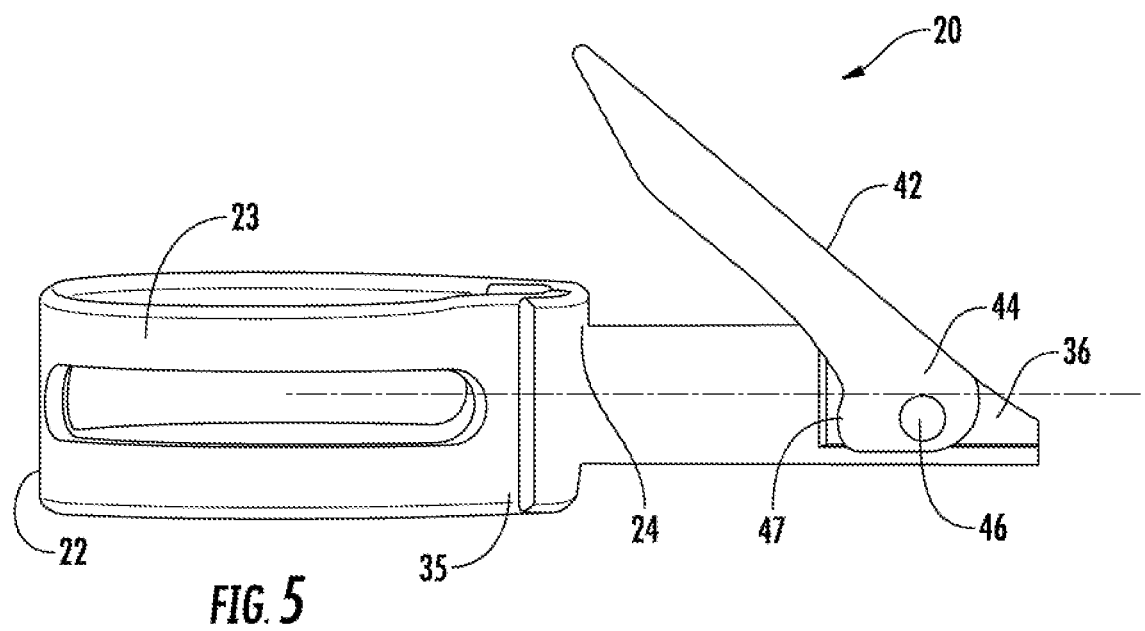
FIG. 5 is a schematic top side view of the removable clamping device of FIG. 3.

As illustrated in FIG. 4, when the lever 42 is in the unlocked position, the slider 32 is in the release position.

In particular, at a first end portion 44 thereof, the lever 42 comprises a pin 46 flanked by two shoulders 47. The pin 46 is engaged in a seat 38, formed at the second end portion 36 of the slider 32, whereas the shoulders 47 are engaged against resting portions 15 of a seat 17 formed on the front surface 16 of the main body 12.

The pin 46 has its axis perpendicular to the longitudinal axis X of the slider 32.

The lever 42 is roto-translatable with respect to the main body 12 and to the slider 32, with rotation that takes place substantially around the pin 46.

As illustrated in FIG. 3, in the locked position the lever 42 is entirely encased in the seat 17. Alternatively, the lever 42 is at least partially encased in the seat 17.

In the non-limiting example illustrated in the figures, the annular element 22 is made with a substantially flat strip 23 wound and closed on itself in a loop.

The strip 23 comprises two through openings 24 and 25 arranged at its two opposite end portions, overlapping one another.

Figure 6:
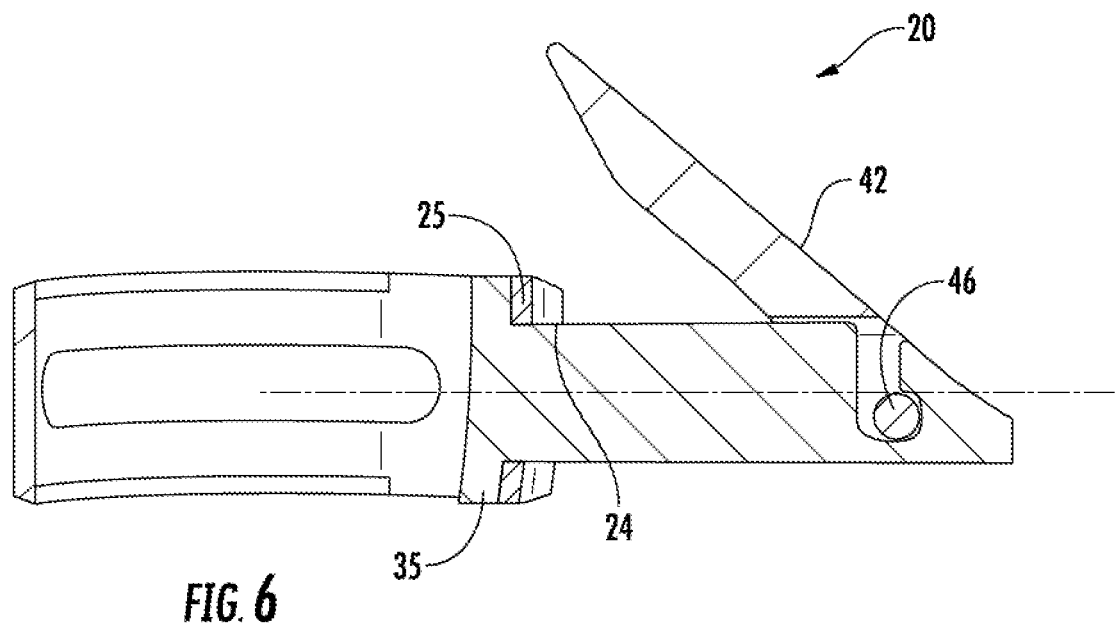
FIG. 6 is a schematic longitudinal section of the removable clamping device of FIG. 5.
Figure 7:
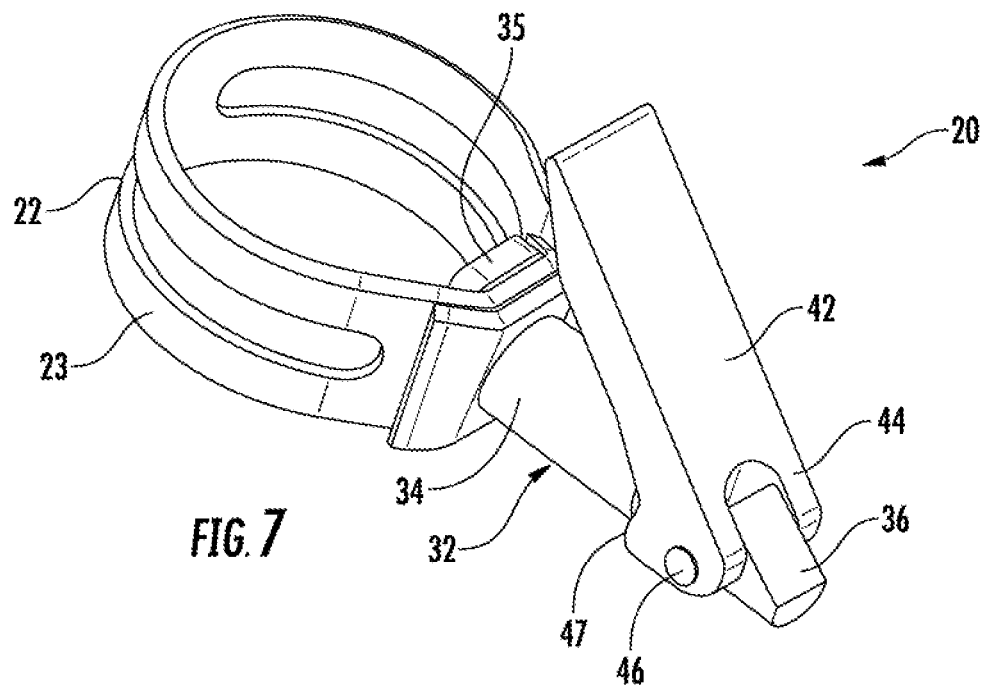
FIGS. 7 and 8 are schematic perspective views, taken from different angles, of the removable clamping device of FIG. 3.
Figure 8:
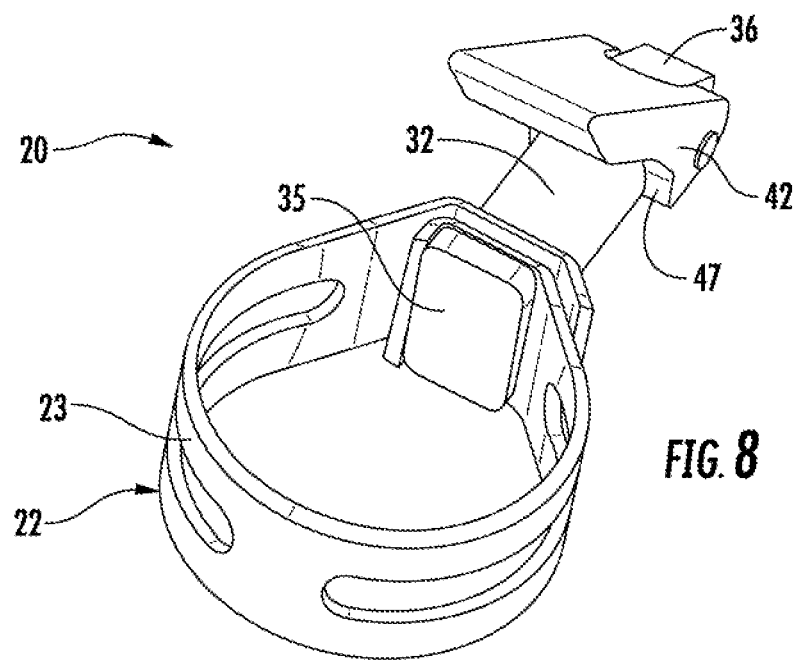

As illustrated in FIGS. 6-8, the slider 32 is equipped with an enlarged head 35 at the first end portion 34. The slider 32 is slotted in the through openings 24 and 25 of the strip 23.

In a variant that is not illustrated, one through opening of the strip 23 is a hole and the other through opening is a slot. In this case, the annular element 22 is connected to the first end portion 34 of the slider 32 by means of a screw, so as to allow adjustment of the circumference of the annular element 22.

In a further variant that is not illustrated, the annular element 22 is openable.

In use, i.e. when the component 10 is mounted on the bicycle, the annular element 22 of the clamping device 20 is inserted over the tubular element on which the component 10 must be mounted. For this purpose, if the tubular element is the handlebars M, i.e. the main tube of the handlebars M, the annular element 22 can be simply slotted thereupon from one of the ends; if, on the other hand, the tubular element is the saddle tube, it is not normally possible to access an end thereof and therefore it is necessary for the annular element 22 to be openable.

Moreover, after the annular element 22 has been positioned (or even beforehand, particularly in the case of an openable annular element), the slider 32 is inserted in the through opening 18, from the rear surface 14 towards the front surface 16. During such insertion, the lever 42 is kept separate from the slider 32, or is flipped towards the axis X, so as to be substantially aligned with the slider 42 and thus be able to pass through the through opening 18.

Once insertion is complete and the position shown in FIG. 4 has thus been reached, the lever 42 can then be rotated, approximately around the pin 46; more precisely, the movement of the lever 42 is a roto-translation resulting from the resting engagement of the shoulders 47 against the resting portions 15 of the seat 17. During this movement, the pin 46 translates along the axis X, in the direction from the rear surface 14 towards the front surface 16, and carries with it the slider 32 with the annular element 22.

Consequently, the tubular element of the bicycle is pulled towards the rear surface 14 of the body 12 of the component 10. The shoulders 47 and the resting portions 15 are shaped so that once the desired final position of the slider 32 has been reached a dead center is passed, so that the tension of the slider 32 tends to keep the lever 42 in its final position. In this final position, shown in FIG. 3, the lever 42 is encased in the seat 17. The component 10 is thus clamped on the frame of the bicycle.

If it is necessary to dismount the component 10 from the frame of the bicycle, it is sufficient to actuate the lever 42 in the opposite direction with respect to what has just been described, thus obtaining the movement of the slider 32 and of the annular element 22 and consequently the disengagement of the tubular element of the bicycle from the rear surface 14 of the body 12 of the component 10.

As can be understood, therefore, both the mounting and the dismounting of the component 10 are extremely simple and quick. Furthermore, the locking obtained is particularly secure.

A second preferred embodiment of the invention is illustrated in FIGS. 9-14, showing a bicycle component 110 (for example a control assembly of bicycle handlebars); elements of the component 110 substantially the same as those of the component 10 already described with reference to the first embodiment of the invention will be indicated with the same reference numeral, whereas elements that are structurally or functionally equivalent but substantially different are indicated with corresponding numerals, increased by 100. The following description refers to what has just been described for the component 10.

The component 110 differs from the component 10 substantially for the removable clamping device 120.

In particular, the removable clamping device 120 comprises an annular element 22 configured to wrap around the tubular element, a slider 132 connected to the annular element 22 and an actuation lever 142 of the slider 132.

The slider 132 extends along its longitudinal axis X and is slidable along such an axis X in a through opening 18 of the main body 12, extending between the rear surface 14 and the front surface 16.

Figure 11:
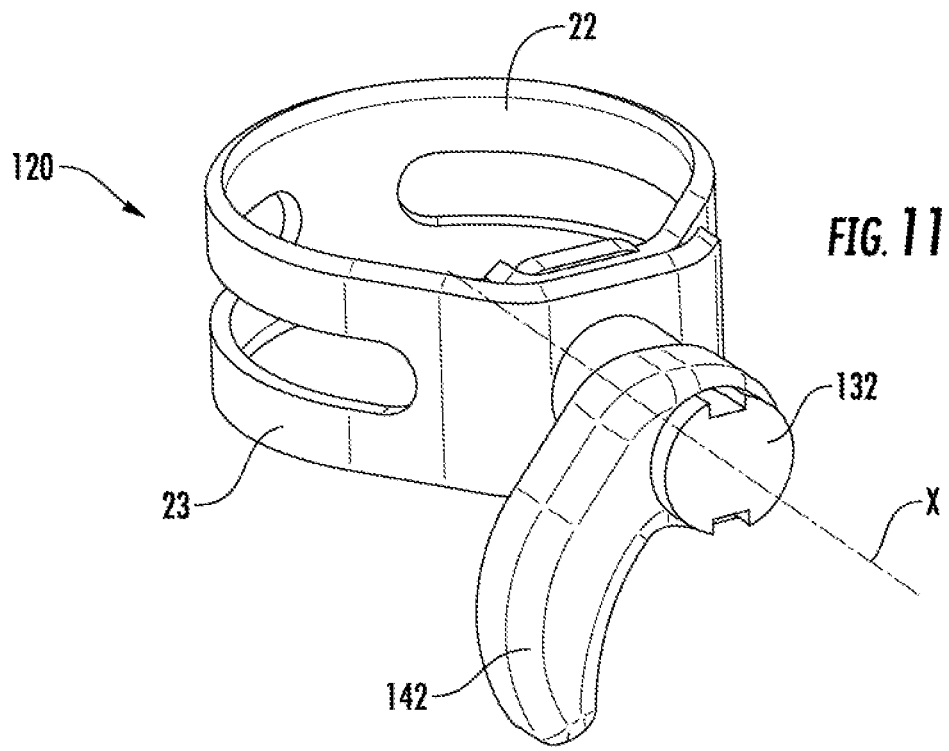
FIG. 11 is a schematic perspective view of the removable clamping device of FIG. 9, wherein the removable clamping device is in a clamping configuration.
Figure 12:
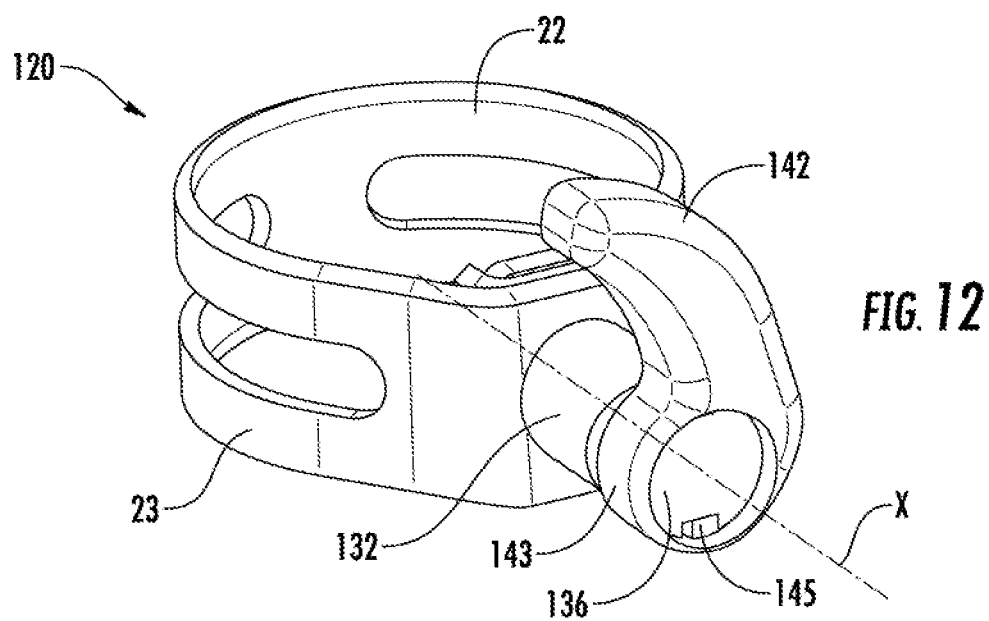
FIG. 12 is a schematic perspective view of the removable clamping device of FIG. 10, wherein the removable clamping device is in a release configuration.
Figure 13:
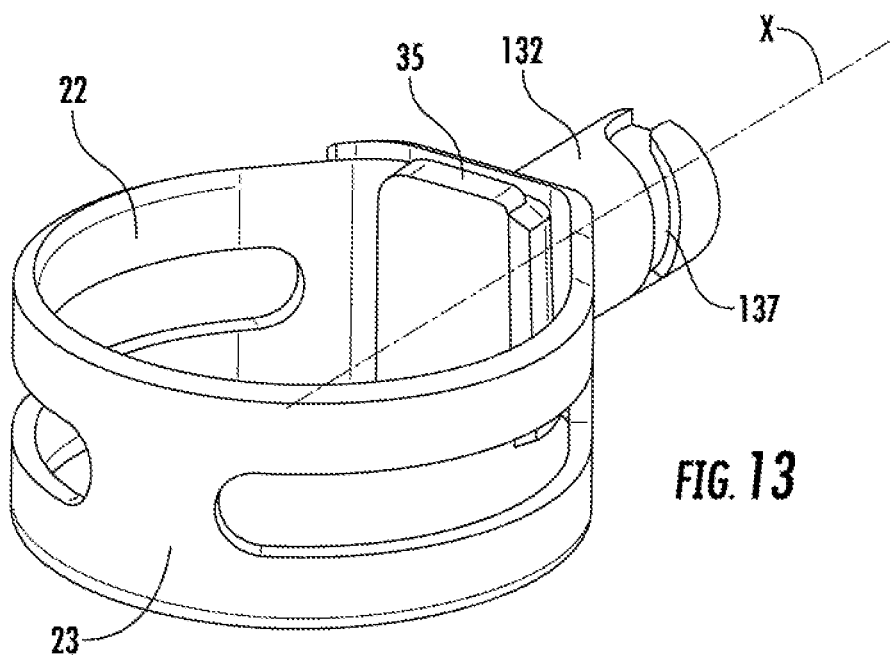
FIG. 13 is a schematic perspective view of a part of the removable clamping device of FIG. 9.
Figure 14:
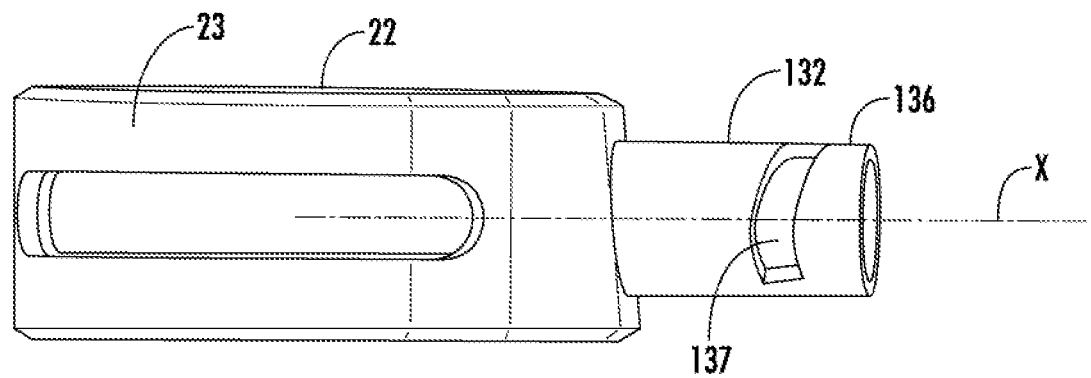
FIG. 14 is a schematic top side view of the part of the removable clamping device of FIG. 13.

As illustrated in FIGS. 11 and 12, the slider 132 is connected to the annular element 22 at a first end portion 34 thereof, so that the annular element 22 slides together with the slider 132, whereas an opposite second end portion 136 thereof is connected to the lever 142.

The slider 132 is slidable in the through opening 18 between a first position or release position (FIG. 10) and a second position or clamping position (FIG. 9); in the clamping position the annular element 22 is pulled towards the rear surface 14 of the main body 12, so as to clamp the tubular element surrounded by the annular element 22 against the rear surface 14.

Figure 9:
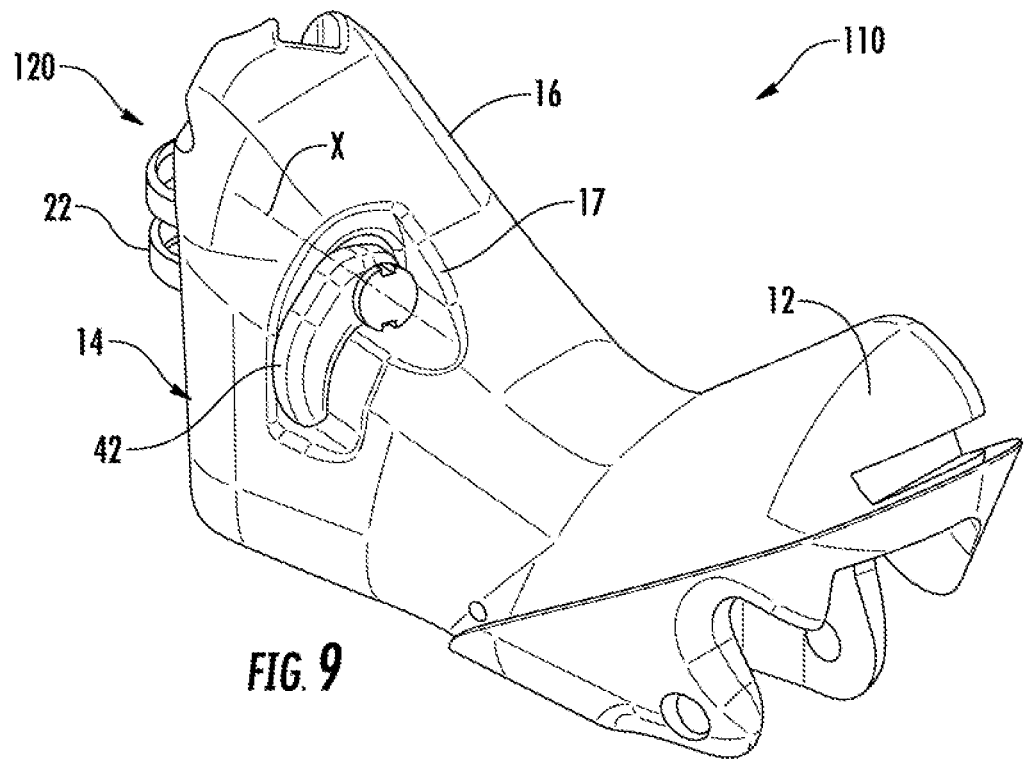
FIG. 9 is a schematic perspective view of a second preferred embodiment of a bicycle component, comprising a removable clamping device for fixing to a tubular element of the bicycle, in accordance with the present invention, wherein the removable clamping device is in a clamping configuration.

The lever 142 of the slider 132 engages on the slider 132 and on the main body 12 and is mobile with respect to the main body 12 between a first position or unlocked position (FIG. 10) and a second position or locked position (FIG. 9).

As illustrated in FIG. 9, when the lever 142 is in the locked position, the slider 132 is in the clamping position.

Figure 10:
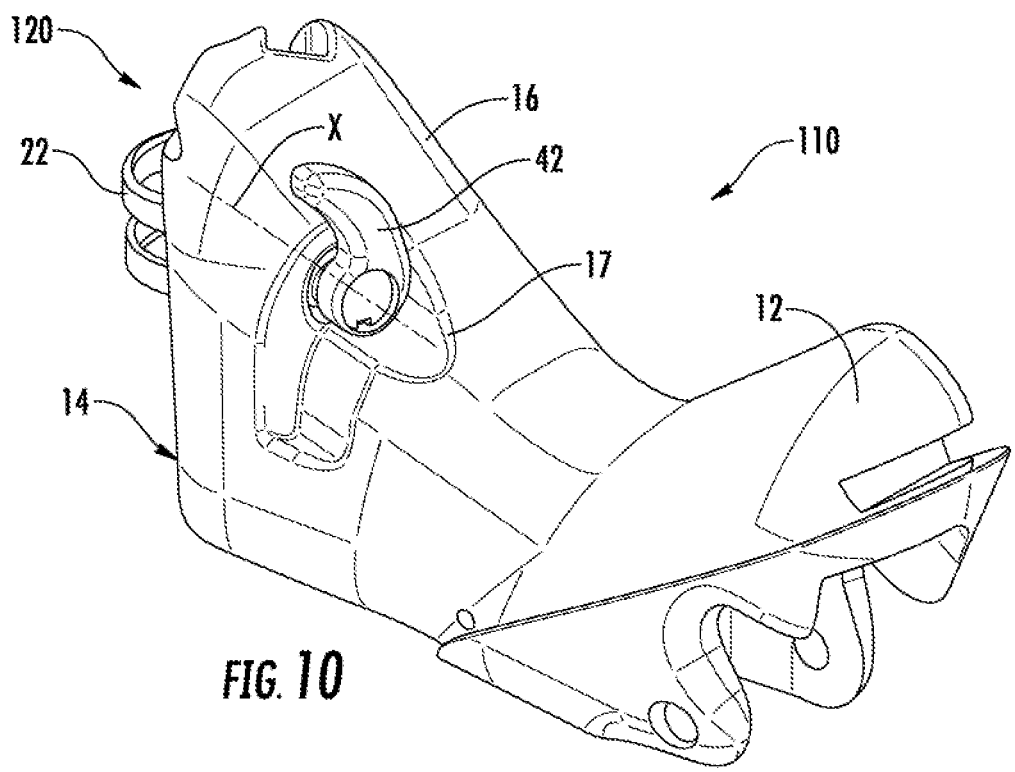
FIG. 10 is a schematic perspective view of the bicycle component of FIG. 9, wherein the removable clamping device is in a release configuration.

As illustrated in FIG. 10, when the lever 142 is in the unlocked position, the slider 132 is in the release position.

In particular, the actuation lever 132 is rotatable with respect to the main body 12, with rotation which takes place around the longitudinal axis X of the slider 132.

The lever 142 comprises a collar portion 143, mounted around the second end portion 136 of the slider 132, which is substantially cylinder shaped.

The slider 132 also has a groove 137 formed on its second end portion 136, shaped so as to be substantially helical for most of its extension.

The lever 142 has a projecting portion, in the form of tooth or follower 145, which extends radially inwards from the collar portion 143 and which is configured to slide in the groove 137 during the rotation of the lever 142.

In use, i.e. when the component 110 is mounted on the bicycle, the annular element 22 of the clamping device 120 is inserted over the tubular element on which the component 110 must be mounted, in a totally analogous manner to what was described for the component 10.

After the positioning of the annular element 22 (or even beforehand, particularly in the case of an openable annular element), the slider 132 is inserted into the through opening 18, from the rear surface 14 towards the front surface 16. During such insertion, the lever 142 is kept separate from the slider 132, to allow the latter to pass through the through opening 18.

Once the insertion of the slider 132 is complete, the lever 142 is mounted on it and the position shown in FIG. 10 is reached. The lever 142 can then be rotated, around the axis X. During this movement, the projecting portion 145 slides along the groove 137; consequently, the slider 132 (which cannot rotate since it is anchored to the tubular element of the bicycle) is made to move along the axis X in the direction from the rear surface 14 towards the front surface 16, and carries the annular element 22 with it.

Consequently, the tubular element of the bicycle is pulled towards the rear surface 14 of the body 12 of the component 11. The groove 137 is shaped so that once the desired final position of the slider 132 has been reached, a dead center has been passed, so that the tension of the slider 132 tends to keep the lever 142 in its final position. In this final position, shown in FIG. 9 (and in FIG. 11), the lever 142 is encased in a seat 17 formed in the body 12. The component 110 is thus clamped on the frame of the bicycle.

If it is necessary to dismount it, it is sufficient to actuate the lever 142 in the opposite direction with respect to what has just been described, thus obtaining the movement of the slider 132 and of the annular element 22 and consequently the disengagement of the tubular element of the bicycle from the rear surface 14 of the body 12 of the component 110.

As can be understood, therefore, both the mounting and the dismounting of the component 110 are extremely simple and quick, and the locking obtained is particularly secure.

Of course, those skilled in the art can bring numerous modifications and variants to the present invention in order to satisfy specific and contingent requirements, all of which are in any case encompassed by the scope of protection defined by the following claims.

What is claimed is:

1. A bicycle component comprising a removable clamping device for fixing to a tubular element of the bicycle and a main body having a rear surface configured to be associated with the tubular element, a front surface, and a through opening extending between the rear surface and the front surface;
wherein the removable clamping device comprises:
an annular element configured to wrap around the tubular element;
a slider that is connected to a first end portion of the annular element and slidable in the through opening between a release position and a clamping position where the annular element is moved towards the rear surface of the main body; and
an actuation lever that engages the slider and is mobile with respect to the main body between an unlocked position and a locked position, wherein in the locked position of the lever places the slider in the clamping position and the lever is at least partially encased in a seat formed on the front surface of the main body.

2. The bicycle component according to claim 1, wherein the lever rotates with respect to the slider around a pin having an axis perpendicular to a longitudinal axis of the slider.

3. The bicycle component according to claim 2, wherein the pin is fixedly connected to the lever and is engaged in a seat at a second end portion of the slider.

4. The bicycle component according to claim 1, wherein the lever is rotatable with respect to the main body, with rotation that takes place around a longitudinal axis of the slider.

5. The bicycle component according to claim 4, wherein the slider comprises a cylindrical second end portion and the lever comprises a collar portion rotatably mounted around the second end portion of the slider.

6. The bicycle component according to claim 5, wherein the slider has a groove formed in the second end portion and wherein the lever has a follower that projects radially inwards from the collar portion and slides in the groove during the rotation of the lever.

7. The bicycle component according to claim 1 wherein the annular element opens for wrapping around the tubular element.

8. The bicycle component according to claim 1, wherein the annular element is a substantially flat strip that forms a loop around the tubular element.

9. The bicycle component according to claim 1, wherein in the locked position the lever is entirely encased in the seat formed on the front surface of the main body.

10. The bicycle component according to claim 1, wherein the bicycle component is one of a control assembly or a derailleur.

11. The bicycle component according to claim 1, wherein the lever rotates with respect to the main body around a longitudinal axis of the slider.

12. A bicycle component comprising a removable clamping device for fixing to a tubular element of the bicycle and a main body having a rear surface configured to be associated with the tubular element, a front surface, and a through opening extending between the rear surface and the front surface;
wherein the removable clamping device comprises:
an annular element configured to wrap around the tubular element;
a slider that is connected to a first end portion of the annular element and slidable in the through opening between a release position and a clamping position where the annular element is moved towards the rear surface of the main body; and
an actuation lever that engages the slider and is mobile with respect to the main body between an unlocked position and a locked position, wherein in the locked position of the lever places the slider in the clamping position,
wherein the annular element is a substantially flat strip that forms a loop around the tubular element, and
wherein the strip has opposite end portions that each include a through opening and the end portions overlap one another in the clamping position.

13. The bicycle component according to claim 12, wherein one through opening of the strip is a hole and the other through opening is an adjustment slot.

14. The bicycle component according to claim 12, wherein the slider has the first end portion enlarged and is slotted in the two through opening, overlapping one another.

15. A bicycle component comprising a removable clamping device for fixing to a tubular element of the bicycle and a main body having a rear surface configured to be associated with the tubular element, a front surface, and a through opening extending between the rear surface and the front surface;
wherein the removable clamping device comprises:
an annular element configured to wrap around the tubular element;
a slider that is connected to a first end portion of the annular element and slidable in the through opening between a release position and a clamping position where the annular element is moved towards the rear surface of the main body; and
an actuation lever that engages the slider and is mobile with respect to the main body between an unlocked position and a locked position, wherein in the locked position of the lever places the slider in the clamping position
wherein the annular element is connected to a first end portion of the slider by a threaded fastener.

16. A combination of a bicycle component and a clamping device for fixing the bicycle component to a tubular element of a bicycle handlebar comprising:
a bicycle component having main body with a rear surface configured to be associated with the tubular element and a through opening extending between the rear surface and a second surface of the main body and connects with a seat in the second surface, and
a clamping device comprising:

an annular element dimensioned to wrap around the tubular element;

a slider that is connected to a first end portion of the annular element and slides in the through opening between a release position and a clamping position where the annular element is moved towards the rear surface of the main body; and, an actuation lever that engages the slider and is mobile with respect to the main body between an unlocked position and a locked position where the slider is in the clamping position.

17. The combination of claim 16 wherein, the actuation lever is positioned in a seat in the second surface of the main body when the slider is in the clamping position.

\* \* \* \* \*